US011727925B2

(12) United States Patent
Sharifi et al.

(10) Patent No.: US 11,727,925 B2
(45) Date of Patent: Aug. 15, 2023

(54) CROSS-DEVICE DATA SYNCHRONIZATION BASED ON SIMULTANEOUS HOTWORD TRIGGERS (71) Applicant: Google LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 219 days.

(21) Appl. No.: 17/115,484

(22) Filed: Dec. 8, 2020

(65) Prior Publication Data
US 2022/0115009 A1    Apr. 14, 2022

Related U.S. Application Data (60) Provisional application No. 63/091,299, filed on Oct. 13, 2020.

(51) Int. Cl.
G10L 15/197    (2013.01)
G10L 15/22    (2006.01)
(Continued)

(52) U.S. Cl.
CPC ............ *G10L 15/197* (2013.01); *G06F 16/27* (2019.01); *G06N 5/043* (2013.01); *G06N 20/00* (2019.01);
(Continued)

(58) Field of Classification Search
CPC ....... G10L 15/00; G10L 15/22; G10L 15/197; G10L 15/1815; G10L 2015/088;
(Continued)

(56) References Cited

U.S. PATENT DOCUMENTS

2002/0013855 A1* 1/2002 Ishii ........................ H04L 41/00
709/237
2007/0124134 A1* 5/2007 Van Kommer ....... G10L 15/197
704/10
(Continued)

FOREIGN PATENT DOCUMENTS

WO    2018208506    11/2018

OTHER PUBLICATIONS

C. Karakaya, H. Touğoç, R. S. Kuzu and A. H. Büyüklü, "Survey of Cross Device Matching Approaches with a Case Study on a Novel Database," 2018 3rd International Conference on Computer Science and Engineering (UBMK), 2018, pp. 139-144, doi: 10.1109/UBMK.2018.8566307. (Year: 2018).*

(Continued)

Primary Examiner — Paras D Shah
Assistant Examiner — Sean E Serraguard
(74) Attorney, Agent, or Firm — Gray Ice Higdon (57) ABSTRACT Techniques are described herein for cross-device data synchronization based on simultaneous hotword triggers. A method includes: executing a first instance of an automated assistant in an inactive state at least in part on a first computing device operated by a user; while in the inactive state, receiving, via one or more microphones of the first computing device, audio data that captures a spoken utterance of the user; processing the audio data using a machine learning model to generate a predicted output that indicates a probability of one or more hotwords being present in the audio data; determining that the predicted output satisfies a threshold that is indicative of the one or more hotwords being present in the audio data; in response to determining that the predicted output satisfies the threshold, performing arbitration with at least one other computing device that is executing at least in part at least one other instance of the (Continued)

automated assistant; and in response to performing arbitration with the at least one other computing device, initiating synchronization of user data or configuration data between the first instance of the automated assistant on the first computing device and the at least one other instance of the automated assistant on the at least one other computing device, the user data comprising data that is based on one or more interactions with the user at the first computing device, the one or more interactions occurring prior to the receiving of the audio data.

20 Claims, 6 Drawing Sheets (51) Int. Cl.
G06F 16/27 (2019.01)
G06N 20/00 (2019.01)
G06N 5/043 (2023.01)
G10L 15/18 (2013.01)
G10L 15/08 (2006.01)

(52) U.S. Cl.
CPC .......... *G10L 15/22* (2013.01); *G10L 15/1815* (2013.01); *G10L 2015/088* (2013.01); *G10L 2015/223* (2013.01)

(58) Field of Classification Search
CPC ... G10L 2015/223; G06F 16/00; G06F 16/27; G06N 5/00; G06N 5/043; G06N 20/00
See application file for complete search history.

(56) References Cited

U.S. PATENT DOCUMENTS

| | | |
|---|---|---|
| 2014/0365885 A1 | 12/2014 | Carson et al. |
| 2015/0169284 A1 | 6/2015 | Quast et al. |
| 2015/0370531 A1* | 12/2015 | Faaborg .................. G06F 3/162 704/275 |
| 2016/0104483 A1* | 4/2016 | Foerster .................. G10L 15/22 704/275 |
| 2017/0084277 A1* | 3/2017 | Sharifi .................... G10L 17/22 |
| 2017/0308602 A1* | 10/2017 | Raghunathan ...... G06F 16/2365 |
| 2018/0332118 A1* | 11/2018 | Phipps .................... G10L 15/22 |
| 2021/0142189 A1* | 5/2021 | Subramanya ......... H04L 67/535 |

OTHER PUBLICATIONS

European Patent Office; Invitation to Pay Additional Fees, issued in PCT Application No. PCT/US2021/054612; 8 pages; dated Feb. 10, 2022.

European Patent Office; International Search Report and Written Opinion of Application No. PCT/US2021/054612; 14 pages; dated Mar. 31, 2022.

* cited by examiner

CROSS-DEVICE DATA SYNCHRONIZATION BASED ON SIMULTANEOUS HOTWORD TRIGGERS

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, by providing textual (e.g., typed) natural language input, and/or through touch and/or utterance free physical movement(s) (e.g., hand gesture(s), eye gaze, facial movement, etc.). An automated assistant responds to a request by providing responsive user interface output (e.g., audible and/or visual user interface output), controlling one or more smart devices, and/or controlling one or more function(s) of a device implementing the automated assistant (e.g., controlling other application(s) of the device).

As mentioned above, many automated assistants are configured to be interacted with via spoken utterances. To preserve user privacy and/or to conserve resources, automated assistants refrain from performing one or more automated assistant functions based on all spoken utterances that are present in audio data detected via microphone(s) of a client device that implements (at least in part) the automated assistant. Rather, certain processing based on spoken utterances occurs only in response to determining certain condition(s) are present.

For example, many client devices, that include and/or interface with an automated assistant, include a hotword detection model. When microphone(s) of such a client device are not deactivated, the client device can continuously process audio data detected via the microphone(s), using the hotword detection model, to generate predicted output that indicates whether one or more hotwords (inclusive of multi-word phrases) are present, such as "Hey Assistant", "OK Assistant", and/or "Assistant". When the predicted output indicates that a hotword is present, any audio data that follows within a threshold amount of time (and optionally that is determined to include voice activity) can be processed by one or more on-device and/or remote automated assistant components such as speech recognition component(s), voice activity detection component(s), etc. Further, recognized text (from the speech recognition component(s)) can be processed using natural language understanding engine(s) and/or action(s) can be performed based on the natural language understanding engine output. The action(s) can include, for example, generating and providing a response and/or controlling one or more application(s) and/or smart device(s)). However, when the predicted output indicates that a hotword is not present, corresponding audio data will be discarded without any further processing, thereby conserving resources and user privacy.

One or more components of these automated assistants may be run on edge (client) devices, in order to provide for increased privacy and/or reduced latency. However, as automated assistants become increasingly decentralized and spread across individual client devices, data used by automated assistants (e.g., for personalization, speaker identification, etc.) becomes more siloed. In cases where automated assistants are used without any cloud-based components (e.g., without a cloud-based account), data used by automated assistants running on various client devices of a user may not be available or may be outdated on one or more of the client devices.

SUMMARY

Some implementations disclosed herein are directed to improving performance of machine learning model(s), improving device performance and capabilities, and improving a user experience provided by a device through cross-device data synchronization based on simultaneous hotword triggers. As described in more detail herein, cross-device data synchronization is provided such that user data is appropriately synchronized between client devices associated with a particular user. In some implementations, this synchronization may help automated assistants provide a user with a consistent experience when the user interacts with different devices. In other implementations, this synchronization may provide for the synchronization of data between one or more existing devices of a user and a newly purchased device of the user.

In some implementations, cross-device data synchronization may be performed in a setting where there are multiple, hotword-enabled devices (e.g., automated assistants) which are not centrally connected (e.g., one or more are not connected to the internet or do not have accounts or connections with a cloud service, or one has an account but others do not, or the devices have accounts with different cloud providers). In some implementations, a local determination is made regarding whether or not a user owns multiple devices that may be synchronized.

In some implementations, cross-device data synchronization may be performed in a setting where devices are connected to a common cloud account, but there is sensitive data which is not stored in the cloud (e.g., a speaker identification model). In some implementations, the synchronization is triggered based on an interaction with an automated assistant device using a standard hotword to wake up the automated assistant device from a low power state. In some implementations, when a hotword event triggers, other devices that are able to handle the query from the same user are discovered. In some implementations, on-device data including personalized models, preferences, and more may be seamlessly shared across a user's devices in a fully on-device scenario, allowing for a consistent experience between all of a user's devices and enabling data to be synchronized in a peer-to-peer manner. In some implementations, the cross-device data synchronization process may be used to streamline the setup process for new devices which are not tied to any existing cloud account.

In various implementations, a method implemented by one or more processors may include executing a first instance of an automated assistant in an inactive state at least in part on a first computing device operated by a user; while in the inactive state, receiving, via one or more microphones of the first computing device, audio data that captures a spoken utterance of the user; processing the audio data using a machine learning model to generate a predicted output that indicates a probability of one or more hotwords being present in the audio data; determining that the predicted output satisfies a threshold that is indicative of the one or more hotwords being present in the audio data; in response to determining that the predicted output satisfies the threshold, performing arbitration with at least one other computing device that is executing at least in part at least one other instance of the automated assistant; and in response to performing arbitration with the at least one other computing device, initiating synchronization of user data or configuration data between the first instance of the automated assistant on the first computing device and the at least one other instance of the automated assistant on the at least one other computing device, the user data comprising data that is based on one or more interactions with the user at the first computing device, the one or more interactions occurring prior to the receiving of the audio data.

In some implementations, the method may further include, prior to initiating synchronization of the user data, determining that permission has been received from the user to perform synchronization of the user data between the first instance of the automated assistant on the first computing device and the at least one other instance of the automated assistant on the at least one other computing device.

In some implementations, the method may further include, prior to initiating synchronization of the user data, determining that there is a match between registered user profiles stored on each of the first computing device and the at least one other computing device.

In some implementations, the method may further include, prior to initiating synchronization of the user data, determining that there is a match between an attribute of the user that is identified as a joint secret and stored on each of the first computing device and the at least one other computing device. In some implementations, the joint secret may be based on a date of birth of the user, an email address of the user, a phone number of the user, or preferences of the user.

In some implementations, the user data that is synchronized may include a personalized hotword model, a personalized speech recognition model, or a personalized query interpretation model. In some implementations, the user data that is synchronized may include recently issued queries of the user. In some implementations, the user data that is synchronized may include preferences of the user. In some implementations, the user data that is synchronized may include a private knowledge graph of the user. In some implementations, the user data may include data that is selected for synchronization based on capabilities of each of the first computing device and the at least one other computing device. In some implementations, the configuration data that is synchronized includes settings of the first computing device or settings of the at least one other computing device.

In some additional or alternative implementations, a computer program product may include one or more computer-readable storage media having program instructions collectively stored on the one or more computer-readable storage media. The program instructions may be executable to: execute a first instance of an automated assistant in an inactive state at least in part on a first computing device operated by a user and execute a second instance of the auto-mated assistant in the inactive state at least in part on a second computing device operated by the user; while in the inactive state, receive, via one or more microphones of the first computing device, first audio data and receive, via one or more microphones of the second computing device, second audio data, the first audio data and the second audio data each capturing a spoken utterance of the user; process, at the first computing device, the first audio data received via the one or more microphones of the first computing device to generate a first predicted output that indicates a probability of one or more synchronization hotwords being present in the first audio data received via the one or more microphones of the first computing device; process, at the second computing device, the second audio data received via the one or more microphones of the second computing device to generate a second predicted output that indicates a probability of the one or more synchronization hotwords being present in the second audio data received via the one or more microphones of the second computing device; determine that the first predicted output satisfies a first threshold that is indicative of the one or more synchronization hotwords being present in the first audio data and that the second predicted output satisfies a second threshold that is indicative of the one or more synchronization hotwords being present in the second audio data; in response to determining that the first predicted output satisfies the first threshold and the second predicted output satisfies the second threshold, perform arbitration between the first instance of the automated assistant on the first computing device and the second instance of the automated assistant on the second computing device; and in response to performing arbitration between the first instance of the automated assistant on the first computing device and the second instance of the automated assistant on the second computing device, initiate synchronization of user data or configuration data between the first instance of the automated assistant on the first computing device and the second instance of the automated assistant on the second computing device, the user data including data based on one or more interactions with the user at the first computing device prior to the receiving of the first audio data and data based on one or more interactions with the user at the second computing device prior to the receiving of the second audio data.

In some implementations, the program instructions may be further executable to transition the first instance of the automated assistant on the first computing device and the second instance of the automated assistant on the second computing device into an active state in response to determining that the first predicted output satisfies the first threshold and the second predicted output satisfies the second threshold.

In some implementations, the program instructions may be further executable to, prior to initiating synchronization of the user data, determine that permission has been received from the user to perform synchronization of the user data between the first instance of the automated assistant on the first computing device and the second instance of the automated assistant on the second computing device.

In some implementations, the program instructions may be further executable to, prior to initiating synchronization of the user data, determine that there is a match between registered user profiles stored on each of the first computing device and the second computing device. In some implementations, the program instructions may be further executable to, prior to initiating synchronization of the user data, determine that there is a match between an attribute of the user that is identified as a joint secret and stored on each of the first computing device and the second computing device.

In some additional or alternative implementations, a system may include a processor, a computer-readable memory, one or more computer-readable storage media, and program instructions collectively stored on the one or more computer-readable storage media. The program instructions may be executable to: execute a first instance of an automated assistant in an inactive state at least in part on a first computing device operated by a user; while in the inactive state, receive, via one or more microphones of the first computing device, audio data that captures a spoken utterance of the user; process the audio data using a machine learning model to generate a predicted output that indicates a probability of one or more synchronization hotwords being present in the audio data; determine that the predicted output satisfies a threshold that is indicative of the one or more synchronization hotwords being present in the audio data; in response to determining that the predicted output satisfies the threshold, identify at least one other computing device executing at least in part at least one other instance of the automated assistant, the at least one other computing device also having received the audio data; and in response to identifying the at least one other computing device, initiate synchronization of user data or configuration data between the first instance of the automated assistant on the first computing device and the at least one other instance of the automated assistant on the at least one other computing device, the user data including data based on one or more interactions with the user at the first computing device prior to the receiving of the audio data.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1A:
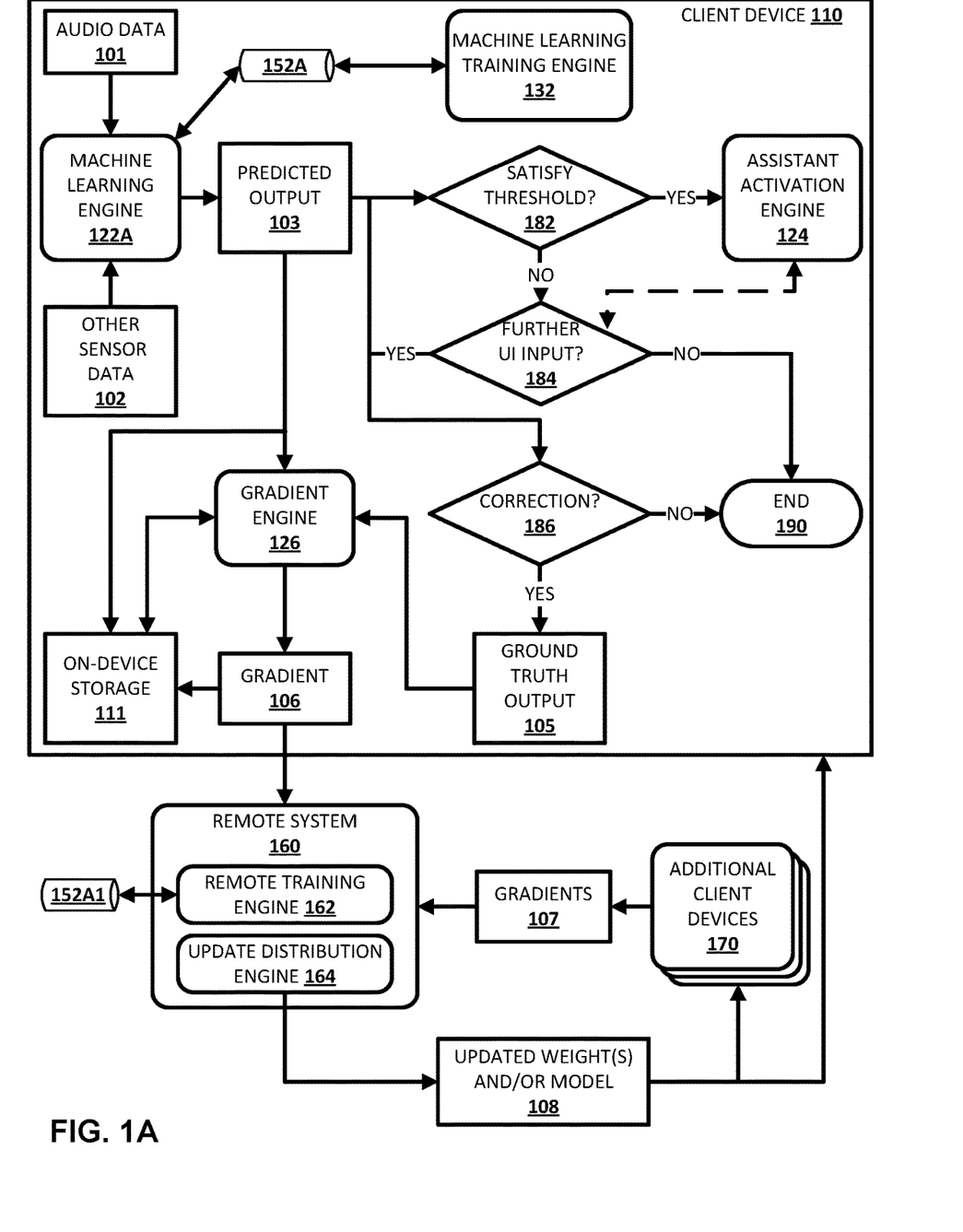
FIG. 1A and FIG. 1B depict example process flows that demonstrate various aspects of the present disclosure, in accordance with various implementations.
Figure 1B:
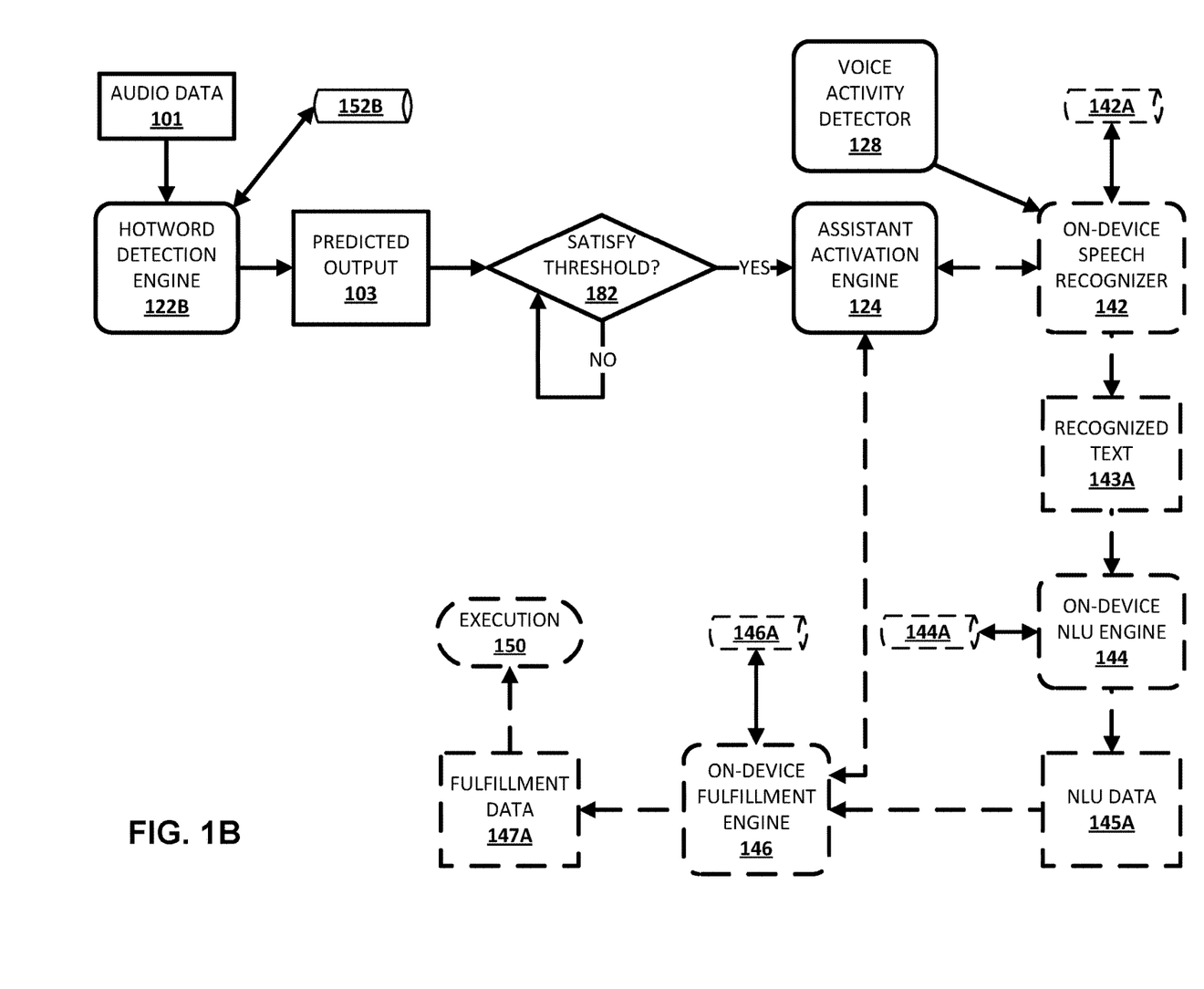

FIGS. 1A and 1B depict example process flows that demonstrate various aspects of the present disclosure. A client device 110 is illustrated in FIG. 1A, and includes the components that are encompassed within the box of FIG. 1A that represents the client device 110. Machine learning engine 122A can receive audio data 101 corresponding to a spoken utterance detected via one or more microphones of the client device 110 and/or other sensor data 102 corresponding to utterance free physical movement(s) (e.g., hand gesture(s) and/or movement(s), body gesture(s) and/or body movement(s), eye gaze, facial movement, mouth movement, etc.) detected via one or more non-microphone sensor components of the client device 110. The one or more non-microphone sensors can include camera(s) or other vision sensor(s), proximity sensor(s), pressure sensor(s), accelerometer(s), magnetometer(s), and/or other sensor(s). The machine learning engine 122A processes the audio data 101 and/or the other sensor data 102, using machine learning model 152A, to generate a predicted output 103. As described herein, the machine learning engine 122A can be a hotword detection engine 122B or an alternative engine, such as a voice activity detector (VAD) engine, an endpoint detector engine, and/or other engine(s).

In some implementations, when the machine learning engine 122A generates the predicted output 103, it can be stored locally on the client device in on-device storage 111, and optionally in association with the corresponding audio data 101 and/or the other sensor data 102. In some versions of those implementations, the predicted output can be retrieved by gradient engine 126 for utilization in generating a gradient 106 at a later time, such as when one or more conditions described herein are satisfied. The on-device storage 111 can include, for example, read-only memory (ROM) and/or random-access memory (RAM). In other implementations, the predicted output 103 can be provided to the gradient engine 126 in real-time.

The client device 110 can make a decision, based on determining whether the predicted output 103 satisfies a threshold at block 182, of whether to initiate currently dormant automated assistant function(s) (e.g., automated assistant 295 of FIG. 2), refrain from initiating currently dormant automated assistant function(s), and/or shut down currently active automated assistant function(s) using an assistant activation engine 124. The automated assistant functions can include: speech recognition to generate recognized text, natural language understanding (NLU) to generate NLU output, generating a response based on the recognized text and/or the NLU output, transmission of the audio data to a remote server, and/or transmission of the recognized text to the remote server. For example, assume the predicted output 103 is a probability (e.g., 0.80 or 0.90) and the threshold at block 182 is a threshold probability (e.g., 0.85), if the client device 110 determines the predicted output 103 (e.g., 0.90) satisfies the threshold (e.g., 0.85) at block 182, then the assistant activation engine 124 can initiate the currently dormant automated assistant function(s).

In some implementations, and as depicted in FIG. 1B, the machine learning engine 122A can be a hotword detection engine 122B. Notably, various automated assistant function(s), such as on-device speech recognizer 142, on-device NLU engine 144, and/or on-device fulfillment engine 146, are currently dormant (i.e., as indicated by dashed lines). Further, assume that the predicted output 103, generated using a hotword detection model 152B and based on the audio data 101, satisfies the threshold at block 182, and that voice activity detector 128 detects user speech directed to the client device 110.

In some versions of these implementations, the assistant activation engine 124 activates the on-device speech recognizer 142, the on-device NLU engine 144, and/or the on-device fulfillment engine 146 as the currently dormant automated assistant function(s). For example, the on-device speech recognizer 142 can process the audio data 101 for a spoken utterance, including a hotword "OK Assistant" and additional commands and/or phrases that follow the hotword "OK Assistant", using on-device speech recognition model 142A, to generate recognized text 143A, the on-device NLU engine 144 can process the recognized text 143A, using on-device NLU model 144A, to generate NLU data 145A, the on-device fulfillment engine 146 can process the NLU data 145A, using on-device fulfillment model 146A, to generate fulfillment data 147A, and the client device 110 can use the fulfillment data 147A in execution 150 of one or more actions that are responsive to the audio data 101.

In other versions of these implementations, the assistant activation engine 124 activates the only on-device fulfillment engine 146, without activating the on-device speech recognizer 142 and the on-device NLU engine 144, to process various commands, such as "No", "Stop", "Cancel", and/or other commands that can be processed without the on-device speech recognizer 142 and the on-device NLU engine 144. For example, the on-device fulfillment engine 146 processes the audio data 101, using the on-device fulfillment model 146A, to generate the fulfillment data 147A, and the client device 110 can use the fulfillment data 147A in execution 150 of one or more actions that are responsive to the audio data 101. Moreover, in versions of these implementations, the assistant activation engine 124 can initially activate the currently dormant automated function(s) to verify the decision made at block 182 was correct (e.g., the audio data 101 does in fact include the hotword "OK Assistant") by initially only activating the on-device speech recognizer 142 to determine the audio data 101 include the hotword "OK Assistant", and/or the assistant activation engine 124 can transmit the audio data 101 to one or more servers (e.g., remote server 160) to verify the decision made at block 182 was correct (e.g., the audio data 101 does in fact include the hotword "OK Assistant").

Turning back to FIG. 1A, if the client device 110 determines the predicted output 103 (e.g., 0.80) fails to satisfy the threshold (e.g., 0.85) at block 182, then the assistant activation engine 124 can refrain from initiating the currently dormant automated assistant function(s) and/or shut down any currently active automated assistant function(s). Further, if the client device 110 determines the predicted output 103 (e.g., 0.80) fails to satisfy the threshold (e.g., 0.85) at block 182, then the client device 110 can determine if further user interface input is received at block 184. For example, the further user interface input can be an additional spoken utterance that includes a hotword, additional utterance free physical movement(s) that serve as a proxy for a hotword, actuation of an explicit automated assistant invocation button (e.g., a hardware button or software button), a sensed "squeeze" of the client device 110 device (e.g., when squeezing the client device 110 with at least a threshold amount of force invokes the automated assistant), and/or other explicit automated assistant invocation. If the client device 110 determines there is no further user interface input received at block 184, then the client device 110 can stop identifying corrections and end at block 190.

However, if the client device 110 determines there is further user interface input received at block 184, then the system can determine whether the further user interface input received at block 184 includes correction(s) at block 186 that contradict the decision made at block 182 (e.g., user-mediated or user-provided corrections). If the client device 110 determines the further user interface input received at block 184 does not include a correction at block 186, the client device 110 can stop identifying corrections and end at block 190. However, if the client device 110 determines that the further user interface input received at block 184 includes a correction at block 186 that contradicts the initial decision made at block 182, then the client device 110 can determine ground truth output 105.

In some implementations, the gradient engine 126 can generate the gradient 106 based on the predicted output 103 to the ground truth output 105. For example, the gradient engine 126 can generate the gradient 106 based on comparing the predicted output 103 to the ground truth output 105. In some versions of those implementations, the client device 110 stores, locally in the on-device storage 111, the predicted output 103 and the corresponding ground truth output 105, and the gradient engine 126 retrieves the predicted output 103 and the corresponding ground truth output 105 to generate the gradient 106 when one or more conditions are satisfied. The one or more conditions can include, for example, that the client device is charging, that the client device has at least a threshold state of charge, that a temperature of the client device (based on one or more on-device temperature sensors) is less than a threshold, and/or that the client device is not being held by a user. In other versions of those implementations, the client device 110 provides the predicted output 103 and the ground truth output 105 to the gradient engine 126 in real-time, and the gradient engine 126 generates the gradient 106 in real-time.

Moreover, the gradient engine 126 can provide the generated gradient 106 to on-device machine learning training engine 132A. The on-device machine learning training engine 132A, when it receives the gradient 106, uses the gradient 106 to update the on-device machine learning model 152A. For example, the on-device machine learning training engine 132A can utilize backpropagation and/or other techniques to update the on-device machine learning model 152A. It is noted that, in some implementations, the on-device machine learning training engine 132A can utilize batch techniques to update the on-device machine learning model 152A based on the gradient 106 and additional gradients determined locally at the client device 110 on the basis of additional corrections.

Further, the client device 110 can transmit the generated gradient 106 to a remote system 160. When the remote system 160 receives the gradient 106, a remote training engine 162 of the remote system 160 uses the gradient 106, and additional gradients 107 from additional client devices 170, to update global weights of a global speech recognition model 152A1. The additional gradients 107 from the additional client devices 170 can each be generated based on the same or similar technique as described above with respect to the gradient 106 (but on the basis of locally identified corrections that are particular to those client devices).

An update distribution engine 164 can, responsive to one or more conditions being satisfied, provide, to the client device 110 and/or other client device(s), the updated global weights and/or the updated global speech recognition model itself, as indicated by 108. The one or more conditions can include, for example, a threshold duration and/or quantity of training since updated weights and/or an updated speech recognition model was last provided. The one or more conditions can additionally or alternatively include, for example, a measured improvement to the updated speech recognition model and/or passage of a threshold duration of time since updated weights and/or an updated speech recognition model was last provided. When the updated weights are provided to the client device 110, the client device 110 can replace weights, of the on-device machine learning model 152A, with the updated weights. When the updated global speech recognition model is provided to the client device 110, the client device 110 can replace the on-device machine learning model 152A with the updated global speech recognition model.

In some implementations, the on-device machine learning model 152A is transmitted (e.g., by the remote system 160 or other component(s)) for storage and use at the client device 110, based on a geographic region and/or other properties of the client device 110 and/or a user of the client device 110. For example, the on-device machine learning model 152A can be one of N available machine learning models for a given language, but can be trained based on corrections that are specific to a particular geographic region and provided to client device 110 based on the client device 110 being primarily located in the particular geographic region.

Figure 2:
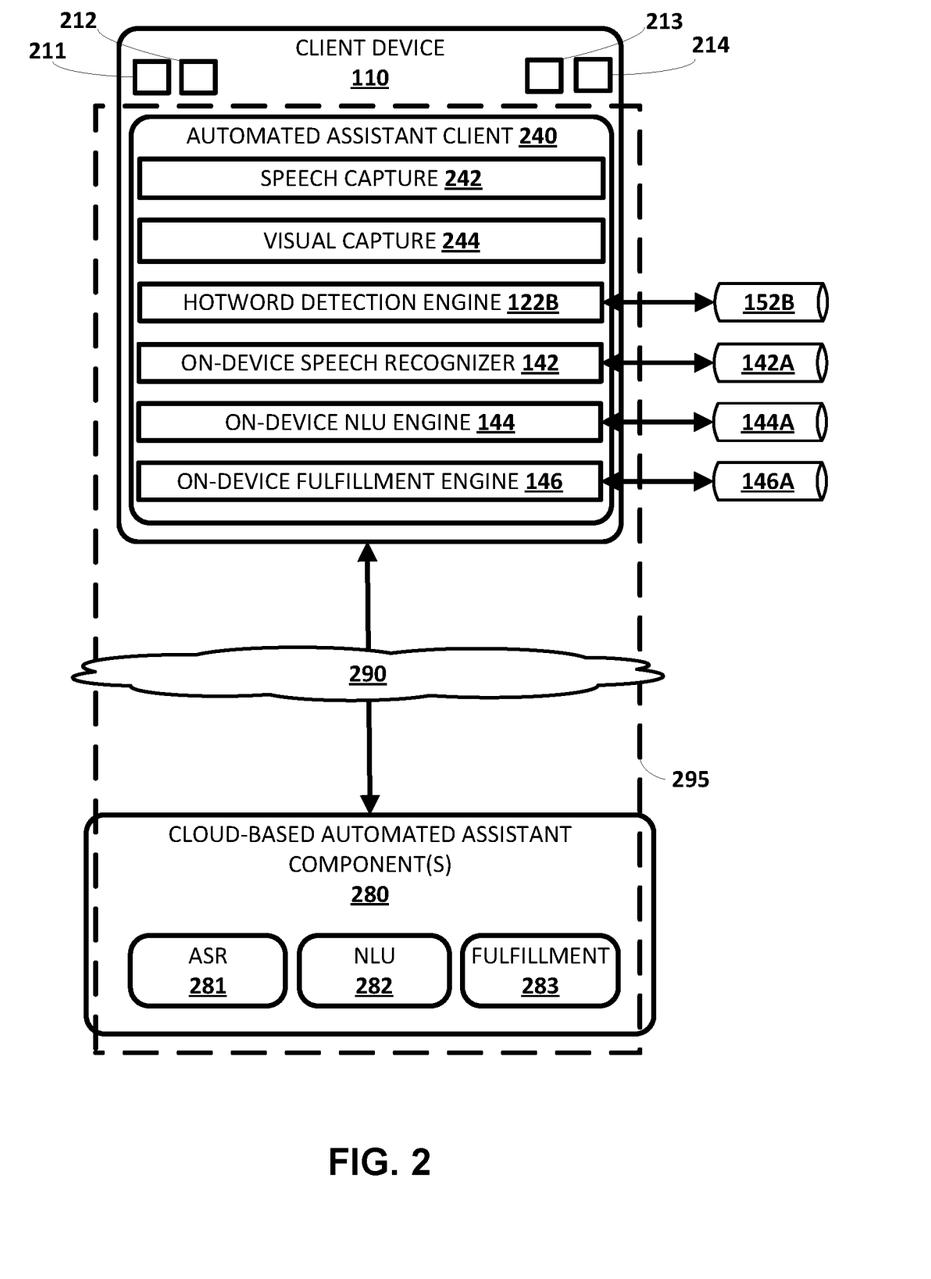
FIG. 2 depicts a block diagram of an example environment that includes various components from FIGS. 1A and 1B, and in which implementations disclosed herein may be implemented.

Turning now to FIG. 2, client device 110 is illustrated in an implementation where the various on-device machine learning engines of FIGS. 1A and 1B are included as part of (or in communication with) an automated assistant client 240. The respective machine learning models are also illustrated interfacing with the various on-device machine learning engines of FIGS. 1A and 1B. Other components from FIGS. 1A and 1B are not illustrated in FIG. 2 for simplicity. FIG. 2 illustrates one example of how the various on-device machine learning engines of FIGS. 1A and 1B and their respective machine learning models can be utilized by the automated assistant client 240 in performing various actions.

The client device 110 in FIG. 2 is illustrated with one or more microphones 211, one or more speakers 212, one or more cameras and/or other vision components 213, and display(s) 214 (e.g., a touch-sensitive display). The client device 110 may further include pressure sensor(s), proximity sensor(s), accelerometer(s), magnetometer(s), and/or other sensor(s) that are used to generate other sensor data that is in addition to audio data captured by the one or more microphones 211. The client device 110 at least selectively executes the automated assistant client 240. The automated assistant client 240 includes, in the example of FIG. 2, the on-device hotword detection engine 122B, the on-device speech recognizer 142, the on-device natural language understanding (NLU) engine 144, and the on-device fulfillment engine 146. The automated assistant client 240 further includes speech capture engine 242 and visual capture engine 244. The automated assistant client 140 can include additional and/or alternative engines, such as a voice activity detector (VAD) engine, an endpoint detector engine, and/or other engine(s).

One or more cloud-based automated assistant components 280 can optionally be implemented on one or more computing systems (collectively referred to as a "cloud" computing system) that are communicatively coupled to client device 110 via one or more local and/or wide area networks (e.g., the Internet) indicated generally at 290. The cloud-based automated assistant components 280 can be implemented, for example, via a cluster of high-performance servers.

In various implementations, an instance of an automated assistant client 240, by way of its interactions with one or more cloud-based automated assistant components 280, may form what appears to be, from a user's perspective, a logical instance of an automated assistant 295 with which the user may engage in a human-to-computer interactions (e.g., spoken interactions, gesture-based interactions, and/or touch-based interactions).

The client device 110 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 213 can take various forms, such as monographic cameras, stereographic cameras, a LIDAR component (or other laser-based component(s)), a radar component, etc. The one or more vision components 213 may be used, e.g., by the visual capture engine 242, to capture vision frames (e.g., image frames, laser-based vision frames) of an environment in which the client device 110 is deployed. In some implementations, such vision frame(s) can be utilized to determine whether a user is present near the client device 110 and/or a distance of the user (e.g., the user's face) relative to the client device 110. Such determination(s) can be utilized, for example, in determining whether to activate the various on-device machine learning engines depicted in FIG. 2, and/or other engine(s).

Speech capture engine 242 can be configured to capture user's speech and/or other audio data captured via microphone(s) 211. Further, the client device 110 may include pressure sensor(s), proximity sensor(s), accelerometer(s), magnetometer(s), and/or other sensor(s) that are used to generate other sensor data that is in addition to the audio data captured via the microphone(s) 211. As described herein, such audio data and other sensor data can be utilized by the hotword detection engine 122B and/or other engine(s) to determine whether to initiate one or more currently dormant automated assistant functions, refrain from initiating one or more currently dormant automated assistant functions, and/or shut down one or more currently active automated assistant functions. The automated assistant functions can include the on-device speech recognizer 142, the on-device NLU engine 144, the on-device fulfillment engine 146, and additional and/or alternative engines. For example, on-device speech recognizer 142 can process audio data that captures a spoken utterance, utilizing on-device speech recognition model 142A, to generate recognized text 143A that corresponds to the spoken utterance. On-device NLU engine 144 performs on-device natural language understanding, optionally utilizing on-device NLU model 144A, on the recognized text 143A to generate NLU data 145A. The NLU data 145A can include, for example, intent(s) that correspond to the spoken utterance and optionally parameter(s) (e.g., slot values) for the intent(s). Further, the on-device fulfillment engine 146 generates the fulfillment data 147A, optionally utilizing on-device fulfillment model 146A, based on the NLU data 145A. This fulfillment data 147A can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data 147A is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s).

Display(s) 214 can be utilized to display the recognized text 143A and/or the further recognized text 143B from the on-device speech recognizer 122, and/or one or more results from the execution 150. Display(s) 214 can further be one of the user interface output component(s) through which visual portion(s) of a response, from the automated assistant client 240, is rendered.

In some implementations, cloud-based automated assistant component(s) 280 can include a remote ASR engine 281 that performs speech recognition, a remote NLU engine 282 that performs natural language understanding, and/or a remote fulfillment engine 283 that generates fulfillment. A remote execution module can also optionally be included that performs remote execution based on local or remotely determined fulfillment data. Additional and/or alternative remote engines can be included. As described herein, in various implementations on-device speech processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 280 can be utilized at least selectively. For example, such component(s) can be utilized in parallel with on-device component(s) and output from such component(s) utilized when local component(s) fail. For example, the on-device fulfillment engine 146 can fail in certain situations (e.g., due to relatively limited resources of client device 110) and remote fulfillment engine 283 can utilize the more robust resources of the cloud to generate fulfillment data in such situations. The remote fulfillment engine 283 can be operated in parallel with the on-device fulfillment engine 146 and its results utilized when on-device fulfillment fails, or can be invoked responsive to determining failure of the on-device fulfillment engine 146.

In various implementations, an NLU engine (on-device and/or remote) can generate NLU data that includes one or more annotations of the recognized text and one or more (e.g., all) of the terms of the natural language input. In some implementations an NLU engine is configured to identify and annotate various types of grammatical information in natural language input. For example, an NLU engine may include a morphological module that may separate individual words into morphemes and/or annotate the morphemes, e.g., with their classes. An NLU engine may also include a part of speech tagger configured to annotate terms with their grammatical roles. Also, for example, in some implementations an NLU engine may additionally and/or alternatively include a dependency parser configured to determine syntactic relationships between terms in natural language input.

In some implementations, an NLU engine may additionally and/or alternatively include an entity tagger configured to annotate entity references in one or more segments such as references to people (including, for instance, literary characters, celebrities, public figures, etc.), organizations, locations (real and imaginary), and so forth. In some implementations, an NLU engine may additionally and/or alternatively include a coreference resolver (not depicted) configured to group, or "cluster," references to the same entity based on one or more contextual cues. In some implementations, one or more components of an NLU engine may rely on annotations from one or more other components of the NLU engine.

An NLU engine may also include an intent matcher that is configured to determine an intent of a user engaged in an interaction with automated assistant 295. An intent matcher can use various techniques to determine an intent of the user. In some implementations, an intent matcher may have access to one or more local and/or remote data structures that include, for instance, a plurality of mappings between grammars and responsive intents. For example, the grammars included in the mappings can be selected and/or learned over time, and may represent common intents of users. For example, one grammar, "play <artist>", may be mapped to an intent that invokes a responsive action that causes music by the <artist> to be played on the client device 110. Another grammar, "[weather|forecast] today," may be match-able to user queries such as "what's the weather today" and "what's the forecast for today?" In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Other slot value(s) can be inferred based on, for example, user location, currently rendered content, user preferences, and/or other cue(s).

A fulfillment engine (local and/or remote) can be configured to receive the predicted/estimated intent that is output by an NLU engine, as well as any associated slot values and fulfill (or "resolve") the intent. In various implementations, fulfillment (or "resolution") of the user's intent may cause various fulfillment information (also referred to as fulfillment data) to be generated/obtained, e.g., by fulfillment engine. This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

Figure 3:
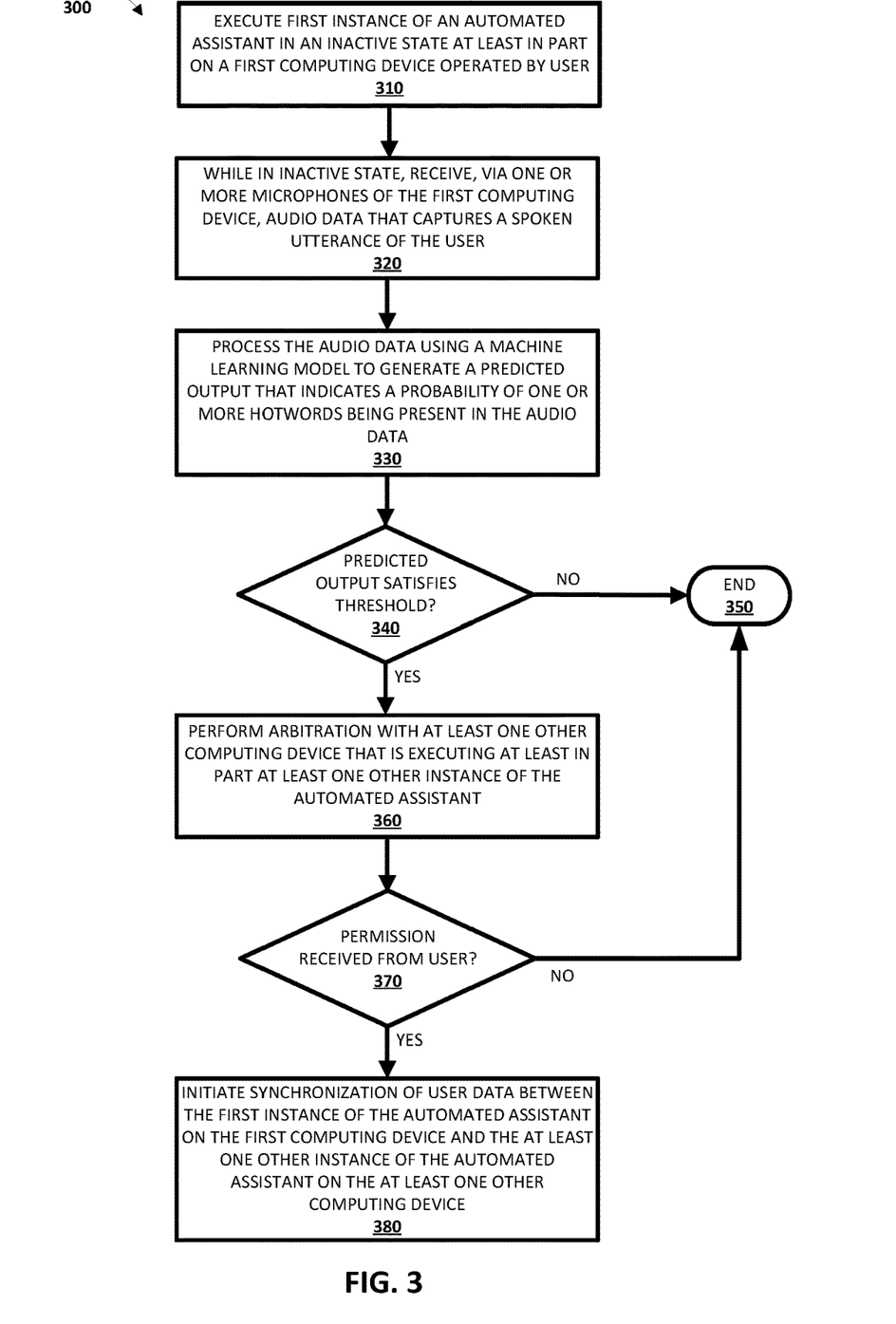
FIG. 3 depicts a flowchart illustrating an example method of cross-device data synchronization based on simultaneous hotword triggers.

FIG. 3 depicts a flowchart illustrating an example method 300 of cross-device data synchronization based on simultaneous hotword triggers. For convenience, the operations of the method 300 are described with reference to a system that performs the operations. This system of method 300 includes one or more processors and/or other component(s) of a client device. Moreover, while operations of the method 300 are shown in a particular order, this is not meant to be limiting. One or more operations may be reordered, omitted, or added.

At block 310, the system executes a first instance of an automated assistant in an inactive state at least in part on a first computing device operated by a user. In implementations, the first computing device can be running an on-device automated assistant stack which may not be connected to a central cloud account. In some implementations, the first computing device may not be connected to the internet.

At block 320, while in the inactive state, the system receives, via one or more microphones of the first computing device, audio data that captures a spoken utterance of the user.

At block 330, the system processes the audio data received at block 320 using a machine learning model to generate a predicted output that indicates a probability of one or more hotwords being present in the audio data. The machine learning model can be, for example, an on-device hotword detection model and/or other machine learning model. The machine learning model may be a deep neural network or any other type of model and may be trained to recognize one or more hotwords. Further, the generated output can be, for example, a probability and/or other likelihood measures. In some implementations, the hotword may be a hotword used to initiate a query (e.g., "OK Assistant"). In other implementations, the hotword may be a hotword that is used as part of a setup flow (e.g., a hotword such as "Initiate Device Setup" used to initiate setup for a new device, a hotword such as "Perform Device Synchronization" used to trigger data synchronization, or a hotword used to train a user's speaker identification model).

At block 340, the system determines whether or not the predicted output generated at block 330 satisfies a threshold that is indicative of the one or more hotwords being present in the audio data. If, at an iteration of block 340, the system determines that the predicted output generated at block 330 does not satisfy the threshold, then the system proceeds to block 350, and the flow ends. On the other hand, if, at an iteration of block 340, the system determines that the predicted output generated at block 330 satisfies the threshold, then the system proceeds to block 360.

Still referring to block 340, in an example, assume the predicted output, generated at block 330, is a probability and the probability must be greater than 0.85 to satisfy the threshold at block 340, and the predicted probability is 0.88. Based on the predicted probability of 0.88 satisfying the threshold of 0.85, the system proceeds to block 360.

At block 360, in response to determining that the predicted output satisfies the threshold at block 340, the system performs arbitration with at least one other computing device that is executing at least in part at least one other instance of the automated assistant. In some implementations, the at least one other computing device also receives audio data capturing the spoken utterance. For example, the at least one other computing device may be in the same room or otherwise in close physical proximity to the user and/or the first computing device, such that the at least one other computing device is also able to receive audio data capturing the utterance via one or more microphones.

Still referring to block 360, in some implementations, the system may use a central server to perform the arbitration. In other implementations, the system may use a local communication protocol such as Bluetooth or Wi-Fi to perform the arbitration. In implementations, the arbitration process may use various factors (e.g. the nearest device, the query contents, highest hotword probability, etc.) to determine which of the devices should be elected to handle the query, while the others are suppressed (i.e., do not respond to the query).

At block 370, the system determines whether or not permission has been received from the user to perform synchronization of the user data between the first instance of the automated assistant on the first computing device and the at least one other instance of the automated assistant on the at least one other computing device.

Still referring to block 370, in some implementations, the system may ask the user for permission (e.g., at least on the first instance of data being synchronized between the devices) to synchronize data between two or more devices. The system may store device identification information (e.g., MAC addresses) in response to the user granting permission, to allow for automatic synchronization in the future.

Still referring to block 370, in other implementations, the system may automatically determine that there is permission to perform the data synchronization based on a secure handshake protocol that verifies that each of the devices are owned by the same user. In some implementations, this handshake can involve a matching process between registered speaker profiles or some other attribute of the user that is identified as a joint secret. For example, device A can declare that it will use the user's date of birth as a secret. Device A then proceeds to encrypt a random string using the date of birth. If device B has the secret available with the same value, it can decrypt the string and return its value back to the other device as confirmation that they belong to the same user. This process may be performed symmetrically such that devices A and B both verify one other, using either the same secret or different secrets.

Still referring to block 370, if, at an iteration of block 370, the system determines that permission has not been received from the user to perform synchronization of the user data between the first instance of the automated assistant on the first computing device and the at least one other instance of the automated assistant on the at least one other computing device, then the system proceeds to block 350, and the flow ends. On the other hand, if, at an iteration of block 370, the system determines permission has been received from the user to perform synchronization of the user data between the first instance of the automated assistant on the first computing device and the at least one other instance of the automated assistant on the at least one other computing device, then the system proceeds to block 380.

Still referring to block 370, in other implementations, instead of (or in addition to) determining whether or not permission has been received from the user, the system determines whether or not there is a match between registered user profiles stored on each of the first computing device and the at least one other computing device. If, at an iteration of block 370, the system determines that there is not a match between registered user profiles stored on each of the first computing device and the at least one other computing device, then the system proceeds to block 350, and the flow ends. On the other hand, if, at an iteration of block 370, the system determines that there is a match between registered user profiles stored on each of the first computing device and the at least one other computing device, then the system proceeds to block 380.

Still referring to block 370, in other implementations, instead of (or in addition to) determining whether or not permission has been received from the user, the system determines whether or not there is a match between an attribute of the user that is identified as a joint secret and stored on each of the first computing device and the at least one other computing device. If, at an iteration of block 370, the system determines that there is not a match between an attribute of the user that is identified as a joint secret and stored on each of the first computing device and the at least one other computing device, then the system proceeds to block 350, and the flow ends. On the other hand, if, at an iteration of block 370, the system determines that there is a match between an attribute of the user that is identified as a joint secret and stored on each of the first computing device and the at least one other computing device, then the system proceeds to block 380. In implementations, the joint secret can be based on a date of birth of the user, an email address of the user, a phone number of the user, and/or user preferences (e.g., provided during a setup flow), etc.

Still referring to block 370, in other implementations, in the case where non-sensitive data such as device-level settings are to be synchronized, the system may proceed to block 380 without determining whether or not there is permission to perform the data synchronization.

At block 380, the system initiates synchronization of user data between the first instance of the automated assistant on the first computing device and the at least one other instance of the automated assistant on the at least one other computing device. In implementations, the synchronization may be a two-way (or N-way, in the case of N devices) transfer of data. In implementations, the user data includes data that is based on one or more interactions with the user at the first computing device, the one or more interactions occurring prior to the receiving of the audio data.

Still referring to block 380, in some implementations, the user data that is synchronized can include a personalized hotword model, a personalized speech recognition model, or a personalized query interpretation model. In some implementations, the user data that is synchronized can include recently issued queries of the user. In some implementations, the user data that is synchronized can include preferences of the user. In some implementations, the user data that is synchronized can include a private knowledge graph of the user. In some implementations, the user data can include data that is selected for synchronization based on capabilities of each of the first computing device and the at least one other computing device. For example, a device that cannot play videos may not need information about the user's video watching history. Additionally, devices that may be resource constrained in terms of storage may only receive selected data. In implementations, some synchronized data (e.g., a private knowledge graph) may be merged, and other synchronized data (e.g., a speech recognition model) may be combined or a determination may be made regarding which version of the data to keep based, e.g., on criteria that indicate quality, such as the number of personalized examples to which the speech recognition model was exposed.

Still referring to block 380, in other implementations, the system may synchronize configuration data (e.g., device-specific configuration information, settings, or preferences) instead of or in addition to synchronizing user data.

Figure 4:
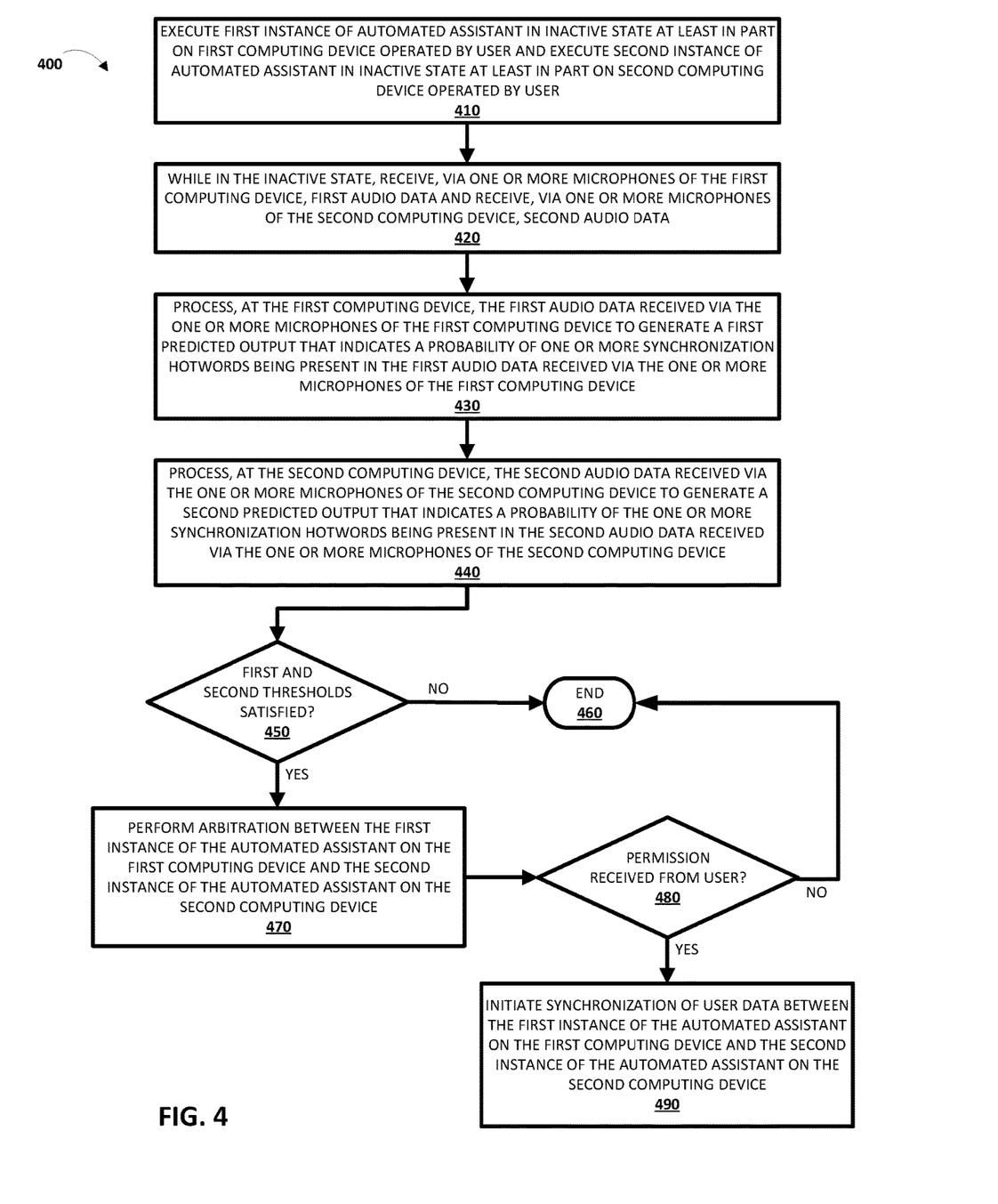
FIG. 4 depicts a flowchart illustrating an example method of cross-device data synchronization based on simultaneous hotword triggers.

FIG. 4 depicts a flowchart illustrating an example method 400 of cross-device data synchronization based on simultaneous hotword triggers. For convenience, the operations of the method 400 are described with reference to a system that performs the operations. This system of method 400 includes one or more processors and/or other component(s) of a client device. Moreover, while operations of the method 400 are shown in a particular order, this is not meant to be limiting. One or more operations may be reordered, omitted, or added.

At block 410, the system executes a first instance of an automated assistant in an inactive state at least in part on a first computing device operated by a user and executes a second instance of the automated assistant in the inactive state at least in part on a second computing device operated by the user.

At block 420, while in the inactive state, the system receives, via one or more microphones of the first computing device, first audio data and receives, via one or more microphones of the second computing device, second audio data. In implementations, the first audio data and the second audio data each capture a spoken utterance of the user.

At block 430, the system processes, at the first computing device, the first audio data received via the one or more microphones of the first computing device at block 420 to generate a first predicted output that indicates a probability of one or more synchronization hotwords being present in the first audio data received via the one or more microphones of the first computing device.

At block 440, the system processes, at the second computing device, the second audio data received via the one or more microphones of the second computing device at block 420 to generate a second predicted output that indicates a probability of the one or more synchronization hotwords being present in the second audio data received via the one or more microphones of the second computing device.

At block 450, the system determines whether or not the first predicted output generated at block 430 satisfies a first threshold that is indicative of the one or more synchronization hotwords being present in the first audio data and determines whether or not the second predicted output generated at block 440 satisfies a second threshold that is indicative of the one or more synchronization hotwords being present in the second audio data. If, at an iteration of block 450, the system determines that it is not the case that both the first predicted output generated at block 430 satisfies the first threshold that is indicative of the one or more synchronization hotwords being present in the first audio data and the second predicted output generated at block 440 satisfies the second threshold that is indicative of the one or more synchronization hotwords being present in the second audio data, then the system proceeds to block 460, and the flow ends. On the other hand, if, at an iteration of block 450, the system determines that both the first predicted output generated at block 430 satisfies the first threshold that is indicative of the one or more synchronization hotwords being present in the first audio data and the second predicted output generated at block 440 satisfies the second threshold that is indicative of the one or more synchronization hotwords being present in the second audio data, then the system proceeds to block 470.

Still referring to block 450, in an example, assume the first predicted output, generated at block 430, is a probability and the probability must be greater than 0.85 to satisfy the first threshold at block 450, and the predicted probability is 0.88. Furthermore, assume the second predicted output, generated at block 440, is a probability and the probability must be greater than 0.85 to satisfy the second threshold at block 450, and the predicted probability is 0.91. Based on both the first predicted output of 0.85 satisfying the first threshold of 0.85 and the second predicted output of 0.91 satisfying the second threshold of 0.85, the system proceeds to block 470.

At block 470, in response to determining that the first predicted output satisfies the first threshold and the second predicted output satisfies the second threshold at block 460, the system performs arbitration between the first instance of the automated assistant on the first computing device and the second instance of the automated assistant on the second computing device. In some implementations, in response to determining that the first predicted output satisfies the first threshold and the second predicted output satisfies the second threshold at block 460, the system may also transition the first instance of the automated assistant on the first computing device and the second instance of the automated assistant on the second computing device into an active state.

At block 480, the system determines whether or not permission has been received from the user to perform synchronization of the user data between the first instance of the automated assistant on the first computing device and the second instance of the automated assistant on the second computing device. If, at an iteration of block 480, the system determines that permission has not been received from the user to perform synchronization of the user data between the first instance of the automated assistant on the first computing device and the second instance of the automated assistant on the second computing device, then the system proceeds to block 460, and the flow ends. On the other hand, if, at an iteration of block 480, the system determines that permission has been received from the user to perform synchronization of the user data between the first instance of the automated assistant on the first computing device and the second instance of the automated assistant on the second computing device, then the system proceeds to block 490.

Still referring to block 480, in other implementations, instead of (or in addition to) determining whether or not permission has been received from the user, the system determines whether or not there is a match between registered user profiles stored on each of the first computing device and the second computing device. If, at an iteration of block 480, the system determines that there is not a match between registered user profiles stored on each of the first computing device and the second computing device, then the system proceeds to block 460, and the flow ends. On the other hand, if, at an iteration of block 480, the system determines that there is a match between registered user profiles stored on each of the first computing device and the second computing device, then the system proceeds to block 490.

Still referring to block 480, in other implementations, instead of (or in addition to) determining whether or not permission has been received from the user, the system determines whether or not there is a match between an attribute of the user that is identified as a joint secret and stored on each of the first computing device and the second computing device. If, at an iteration of block 480, the system determines that there is not a match between an attribute of the user that is identified as a joint secret and stored on each of the first computing device and the second computing device, then the system proceeds to block 460, and the flow ends. On the other hand, if, at an iteration of block 480, the system determines that there is a match between an attribute of the user that is identified as a joint secret and stored on each of the first computing device and the second computing device, then the system proceeds to block 490. In implementations, the joint secret can be based on a the joint secret can be based on a date of birth of the user, an email address of the user, a phone number of the user, and/or user preferences, etc.

Still referring to block 480, in other implementations, in the case where non-sensitive data such as device-level settings are to be synchronized, the system may proceed to block 490 without determining whether or not there is permission to perform the data synchronization.

At block 490, the system initiates synchronization of user data between the first instance of the automated assistant on the first computing device and the second instance of the automated assistant on the second computing device. In implementations, the user data can include data based on one or more interactions with the user at the first computing device prior to the receiving of the first audio data and data based on one or more interactions with the user at the second computing device prior to the receiving of the second audio data.

Still referring to block 490, in some implementations, the user data that is synchronized can include a personalized hotword model, a personalized speech recognition model, or a personalized query interpretation model. In some implementations, the user data that is synchronized can include recently issued queries of the user. In some implementations, the user data that is synchronized can include preferences of the user. In some implementations, the user data that is synchronized can include a private knowledge graph of the user. In some implementations, the user data can include data that is selected for synchronization based on capabilities of each of the first computing device and the second computing device.

Still referring to block 490, in other implementations, the system may synchronize configuration data (e.g., device-specific configuration information, settings, or preferences) instead of or in addition to synchronizing user data.

Figure 5:
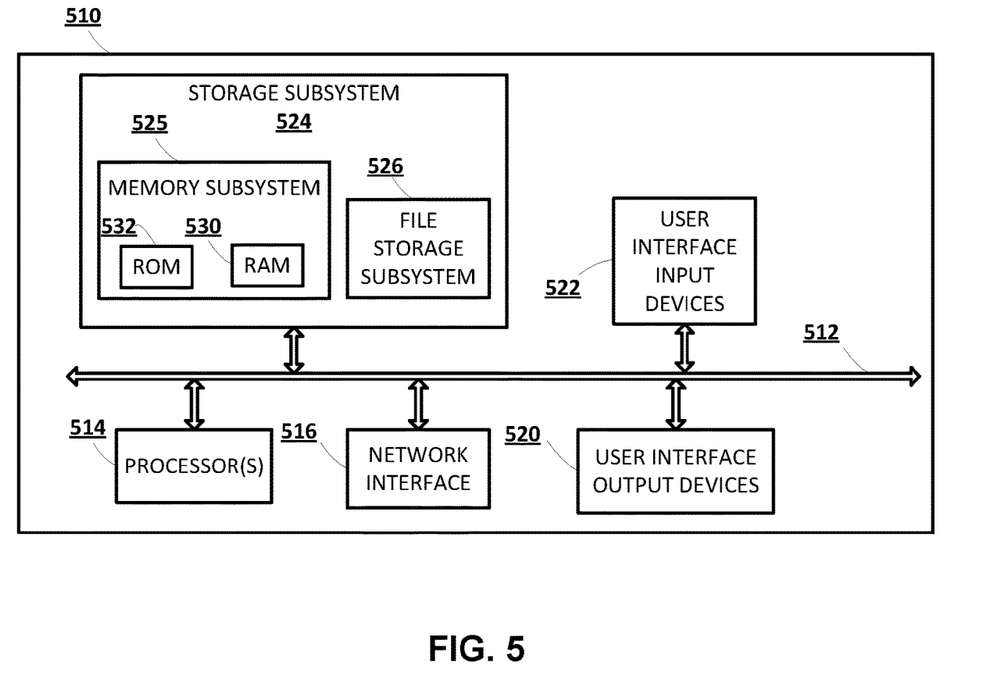
FIG. 5 depicts an example architecture of a computing device.

FIG. 5 is a block diagram of an example computing device 510 that may optionally be utilized to perform one or more aspects of techniques described herein. In some implementations, one or more of a client device, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIGS. 1A and 1B.

These software modules are generally executed by processor 514 alone or in combination with other processors. The memory subsystem 525 included in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
executing a first instance of an automated assistant in an inactive state at least in part on a first computing device operated by a user;
while in the inactive state, receiving, via one or more microphones of the first computing device, audio data that captures a spoken utterance of the user;
processing the audio data using a machine learning model to generate a predicted output that indicates a probability of one or more hotwords being present in the audio data;
determining that the predicted output satisfies a threshold that is indicative of the one or more hotwords being present in the audio data;
in response to determining that the predicted output satisfies the threshold, performing arbitration with at least one other computing device that is executing at least in part at least one other instance of the automated assistant; and
in response to performing arbitration with the at least one other computing device:
selecting user data for synchronization based on respective capabilities of each of the first computing device and the at least one other computing device; and
initiating bidirectional synchronization of the user data between the first instance of the automated assistant on the first computing device and the at least one other instance of the automated assistant on the at least one other computing device, wherein the bidirectional synchronization occurs at the first computing device and the at least one other computing device, the user data comprising data that is based on one or more interactions with the user at the first computing device, the one or more interactions occurring prior to the receiving of the audio data.

2. The method according to claim 1, further comprising, prior to initiating bidirectional synchronization of the user data, determining that permission has been received from the user to perform synchronization of the user data between the first instance of the automated assistant on the first computing device and the at least one other instance of the automated assistant on the at least one other computing device.

3. The method according to claim 1, further comprising, prior to initiating bidirectional synchronization of the user data, determining that there is a match between registered user profiles stored on each of the first computing device and the at least one other computing device.

4. The method according to claim 1, further comprising, prior to initiating bidirectional synchronization of the user data, determining that there is a match between an attribute of the user that is identified as a joint secret and stored on each of the first computing device and the at least one other computing device.

5. The method according to claim 4, wherein the joint secret is based on a date of birth of the user, an email address of the user, a phone number of the user, or preferences of the user.

6. The method according to claim 1, wherein the user data that is synchronized comprises a personalized hotword model, a personalized speech recognition model, or a personalized query interpretation model.

7. The method according to claim 1, wherein the user data that is synchronized comprises recently issued queries of the user.

8. The method according to claim 1, wherein the user data that is synchronized comprises preferences of the user.

9. The method according to claim 1, wherein the user data that is synchronized comprises a private knowledge graph of the user.

10. The method according to claim 1, further comprising, in response to performing arbitration with the at least one other computing device, initiating synchronization of configuration data, the configuration data comprising settings of the first computing device or settings of the at least one other computing device.

11. A computer program product comprising one or more non-transitory computer-readable storage media having program instructions collectively stored on the one or more non-transitory computer-readable storage media, the program instructions executable to:
execute a first instance of an automated assistant in an inactive state at least in part on a first computing device operated by a user and execute a second instance of the automated assistant in the inactive state at least in part on a second computing device operated by the user;
while in the inactive state, receive, via one or more microphones of the first computing device, first audio data and receive, via one or more microphones of the second computing device, second audio data, the first audio data and the second audio data each capturing a spoken utterance of the user;
process, at the first computing device, the first audio data received via the one or more microphones of the first computing device to generate a first predicted output that indicates a probability of one or more synchronization hotwords being present in the first audio data received via the one or more microphones of the first computing device;
process, at the second computing device, the second audio data received via the one or more microphones of the second computing device to generate a second predicted output that indicates a probability of the one or more synchronization hotwords being present in the second audio data received via the one or more microphones of the second computing device;
determine that the first predicted output satisfies a first threshold that is indicative of the one or more synchronization hotwords being present in the first audio data and that the second predicted output satisfies a second threshold that is indicative of the one or more synchronization hotwords being present in the second audio data;
in response to determining that the first predicted output satisfies the first threshold and the second predicted output satisfies the second threshold, perform arbitration between the first instance of the automated assistant on the first computing device and the second instance of the automated assistant on the second computing device; and
in response to performing arbitration between the first instance of the automated assistant on the first computing device and the second instance of the automated assistant on the second computing device:
select user data for synchronization based on respective capabilities of each of the first computing device and the second computing device; and
initiate bidirectional synchronization of the user data between the first instance of the automated assistant on the first computing device and the second instance of the automated assistant on the second computing device, wherein the bidirectional synchronization occurs at the first computing device and the second computing device, the user data comprising data based on one or more interactions with the user at the first computing device prior to the receiving of the first audio data and data based on one or more interactions with the user at the second computing device prior to the receiving of the second audio data.

12. The computer program product according to claim 11, wherein the program instructions are further executable to transition the first instance of the automated assistant on the first computing device and the second instance of the automated assistant on the second computing device into an active state in response to determining that the first predicted output satisfies the first threshold and the second predicted output satisfies the second threshold.

13. The computer program product according to claim 12, wherein the program instructions are further executable to, prior to initiating bidirectional synchronization of the user data, determine that permission has been received from the user to perform synchronization of the user data between the first instance of the automated assistant on the first computing device and the second instance of the automated assistant on the second computing device.

14. The computer program product according to claim 12, wherein the program instructions are further executable to, prior to initiating bidirectional synchronization of the user data, determine that there is a match between registered user profiles stored on each of the first computing device and the second computing device.

15. The computer program product according to claim 12, wherein the program instructions are further executable to, prior to initiating bidirectional synchronization of the user data, determine that there is a match between an attribute of the user that is identified as a joint secret and stored on each of the first computing device and the second computing device.

16. A system comprising:
a processor, a computer-readable memory, one or more computer-readable storage media, and program instructions collectively stored on the one or more computer-readable storage media, the program instructions executable to:
execute a first instance of an automated assistant in an inactive state at least in part on a first computing device operated by a user;
while in the inactive state, receive, via one or more microphones of the first computing device, audio data that captures a spoken utterance of the user;

process the audio data using a machine learning model to generate a predicted output that indicates a probability of one or more synchronization hotwords being present in the audio data;

determine that the predicted output satisfies a threshold that is indicative of the one or more synchronization hotwords being present in the audio data;

in response to determining that the predicted output satisfies the threshold, identify at least one other computing device executing at least in part at least one other instance of the automated assistant, the at least one other computing device also having received the audio data; and in response to identifying the at least one other computing device:

select user data for synchronization based on respective capabilities of each of the first computing device and the at least one other computing device; and     initiate bidirectional synchronization of the user data between the first instance of the automated assistant on the first computing device and the at least one other instance of the automated assistant on the at least one other computing device, wherein the bidirectional synchronization occurs at the first computing device and the at least one other computing device, the user data comprising data based on one or more interactions with the user at the first computing device prior to the receiving of the audio data.

17. The system according to claim 16, wherein the user data that is synchronized comprises a personalized hotword model, a personalized speech recognition model, or a personalized query interpretation model.

18. The system according to claim 16, wherein the user data that is synchronized comprises recently issued queries of the user.

19. The system according to claim 16, wherein the user data that is synchronized comprises preferences of the user.

20. The system according to claim 16, wherein:

the at least one other computing device includes a new device, and the one or more synchronization hotwords comprise a hotword used to initiate setup for the new device.

* * * * *